May 11, 1937.   D. F. WARNER   2,080,243
SPEED GOVERNOR
Filed June 22, 1935
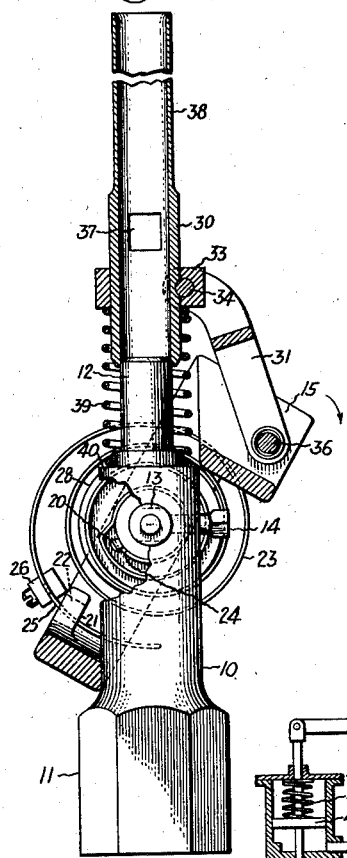
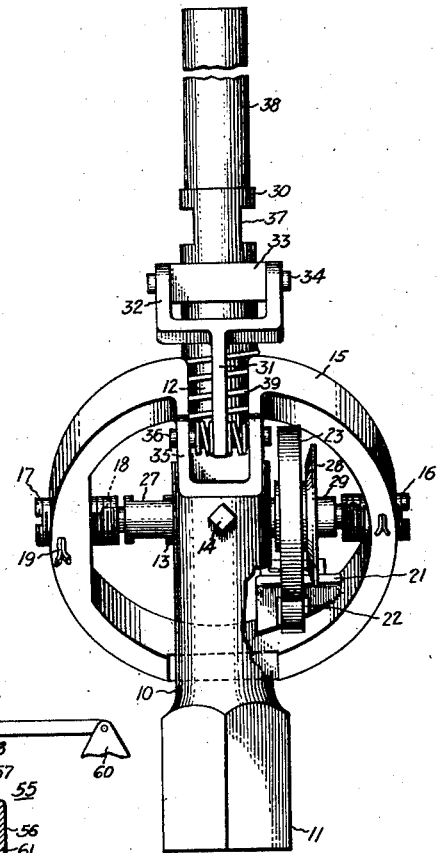
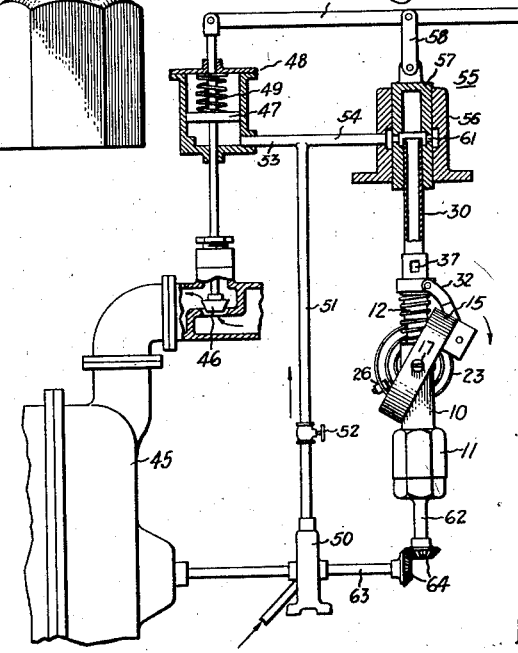
Inventor:
Donald F. Warner,
by Harry E. Dunham
His Attorney Patented May 11, 1937

2,080,243

UNITED STATES PATENT OFFICE 2,080,243

SPEED GOVERNOR

Donald F. Warner, Lynn, Mass., assignor to General Electric Company, a corporation of New York Application June 22, 1935, Serial No. 27,949

2 Claims. (Cl. 264—20)

The present invention relates to speed governors for governing a machine in response to speed changes.

The object of my invention is to provide an improved construction and arrangement of speed governors which are reliable in operation and can be manufactured at comparatively low cost.

For a consideration of what I believe to be novel and my invention, attention is directed to the following description and the claims appended thereto in connection with the accompanying drawing.

In the drawing, Fig. 1 represents a front view, partly in section, of a speed governor embodying my invention; Fig. 2 is a side view of Fig. 1; and Fig. 3 illustrates an application of the governor shown in Figs. 1 and 2 in connection with an elastic fluid turbine.

The governor comprises a rotatable shaft or spindle 10 having a lower end 11 arranged for connection to a drive member. An upper end portion 12 of the governor shaft is reduced in diameter. A cross shaft 13 projects through an opening in the shaft 10 and is held in position by means of a set screw 14. By cross shaft I mean a shaft disposed at right angles with the main shaft or spindle 10. A ring 15 is rotatably supported on the cross shaft 13 by means including bearing members 16 and 17 screwed into diametrically opposite openings in the ring 15 and forming bearings 18 for receiving end portions of the cross shaft 13. The bearings 16 and 17 are held in position by cotter pins 19. The cross shaft 13 has a lateral projection, in the present instance formed by a pin 20 (Fig. 1). The ring 15 forms an inwardly projecting lug 21 with an opening 22. A flat, spirally wound spring, hereafter termed clock type spring 23 is provided to bias the ring into a tilted position with respect to the axis of rotation of the shaft 10 and to counteract centrifugal forces exerted on the ring during operation, which forces tend to move the ring towards a plane perpendicular to the axis of rotation. According to my invention the inner end 24 of the spring abuts against the lateral projection formed by the pin 20, whereas the outer end portion 25 projects through the opening 22 formed by the lug 21. A clamp 26 is secured to the end portion 25 adjacent the opening 22. When out of operation, the ring assumes the position shown in Fig. 1. The clock type spring 23 then is preferably in a neutral condition, that is, neither compressed nor stressed. The centrifugal forces acting on the ring during operation tend to turn the ring in clockwise direction as viewed in Fig. 1. This movement causes the spring 23 to be put in a tensioned condition, it being noted that the spring in this instance is not wound up but unwound. Clockwise movement of the ring 15 (Fig. 1) causes a similar movement of the clamp 26 which engages the lug 22, thereby unwinding the spring. The governor may be adjusted either by moving the clamp 26 along the end portion of the spring or, if desired, by changing the angular position of the lateral projection 20. This may be easily accomplished by loosening the set screw 14 and slightly turning the cross shaft 13. The cross shaft has flattened portions 27 on diametrically opposite sides to facilitate turning movement by means of a wrench during adjustment of the governor.

During operation, centrifugal forces are also set up on the clock type spring 23, effecting lateral displacement or bending of the different turns of the spring.

According to my invention I provide a stop or limiting means for limiting or reducing lateral displacement or sidewise bending of the different turns of the spring. This stop is in the form of a conical member 28 having a hub 29 secured to the cross shaft 13. The conical surface is tapered away from the spring center and is disposed on that side of the flat spring which faces away from the axis of rotation. During operation the ring is turned in clockwise direction, as viewed in Fig. 1, around the axis of the cross pin. The magnitude of such angular movement depends upon the speed of rotation and the adjustment of the spring 23. As the speed reaches a maximum, the ring may be turned into a maximum angular position which approaches a plane through the axis of the cross shaft, perpendicular to the axis of the governor shaft 10, that is, the axis of rotation. The different angular positions of the ring 15 are transmitted to a governing element, in the present instance a sleeve 30, which is arranged axially with respect to the shaft 10. As best shown in Fig. 1, the sleeve 30 has a lower end portion surrounding the reduced end portion 12 of the governor shaft 10. Movement of the ring 15 to the sleeve 30 is transmitted by means including a link 31. The upper end of the link has a forked member 32 pivotally connected to the sleeve by means including a link block 33 and a pin 34. During manufacture, the link block 33 is provided with an opening engaging the outer surface of the sleeve 30 and is secured thereto by the link pin 34 which has one side disposed in a recess formed in the outer surface of the sleeve 30 and the other side disposed in a recess formed in the link block 33. These recesses are preferably formed by boring a hole through the assembled link block 33 and the sleeve 30. The lower end portion of the link 31 projects into a U-shaped lug 35, integrally formed with the ring 15, and is pivotally connected thereto by a lower link pin 36 projecting through the lug 35 and the lower end of the link 31. Springs surrounding the lower link pin 36 are placed on each side of the link 31 to act as shock-absorbing means during operation. Such shock-absorbing means are desirable, especially to take care of change in relative position per revolution should misalignment occur between the pilot valve and the governor shaft or where a speed governor is subjected to sudden speed changes. The shock-absorbing means then form a yieldable connection between the link 31 and the ring 15 whereby sudden acceleration or retardation of the ring 15 is more smoothly transmitted to the link 31 and the governing sleeve 30 connected thereto. The lower portion of the governing sleeve 30 has openings 37 on diametrically opposite sides which may be easily formed during manufacture by a cross-milling operation. The sleeve 30 has an upper portion 38 which is machined to form a smooth, cylindrical, outer surface.

During operation, an increase in speed causes clockwise turning movement of the ring as viewed in Fig. 1, against the counter-force of the spring 23. Clockwise turning movement of the ring causes downward movement of the sleeve 30 and, vice versa, a decrease in speed causes counterclockwise movement of the ring and effects upward movement of the governing sleeve 30. In order to reduce lost motion between the governor ring 15 and the sleeve 30, a coiled spring 39 is provided surrounding the lower end portion of the sleeve 30 and engaging the lower surface of the link block 33 and a shoulder 40 formed on the shaft 10. This spring is slightly compressed and serves primarily to eliminate lost motion between the ring 15 and the block 33.

The arrangement shown in Fig. 3 illustrates a specific application of the governor in connection with an elastic fluid turbine 45. The turbine 45 has an inlet valve 46 for controlling the flow of elastic fluid to the turbine. The control is to be effected in response to speed changes. To this end the valve 46 is connected to a piston 47 of a hydraulic motor 48 including a compression spring 49 acting downward on the piston 47. Operating fluid is supplied under pressure to the hydraulic motor 48 by means including a pump 50 driven by the turbine shaft and having a discharge connected to a conduit 51 including a needle or pressure adjusting valve 52. The conduit 51 has a branch 53 connected to the hydraulic motor 48 and another branch 54 connected to a pilot valve 55. The latter includes a cylinder 56, a bushing 57 connected by a link 58 to an intermediate point of a lever 59. The left-hand end of the lever 59 is pivotally connected to the hydraulic motor piston 47 and the right-hand end of the lever 59 is connected to a fulcrum 60. The bushing has ports 61 for admitting fluid, such as oil, from the branch pipe 54 to the interior of the bushing. The flow of oil through the ports 61 is controlled by the governor sleeve 30 forming a part of the governor shown in Figs. 1 and 2. The lower end portion 11 of the governor shaft 10 is connected to a drive member comprising a shaft 62 driven from the turbine shaft 63 by a gearing 64.

During operation, an increase in turbine speed effects increased speed of rotation of the governor shaft 10, whereby the governor ring 15 is moved in clockwise direction, effecting downward movement of the governor sleeve 30. This increases the effective opening area of the ports 61 whereby the resistance to flow is decreased and an increased amount of fluid is discharged through the branch conduit 54 into the central bore of the sleeve 30, whence it flows through the openings 37 to a tank, not shown. This increased flow effects a reduction in pressure below the piston 47 of the hydraulic motor 48, resulting in downward movement of the piston and consequently closing movement of the valve. The operation of the mechanism in response to a drop in speed of the turbine is similar, the different elements moving in opposite direction and effecting opening travel of the valve 46.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A speed governor including a governor shaft, a cross pin on the shaft, a ring surrounding the governor shaft and having diametrically opposite portions rotatably supported on the cross pin, a clock type spring surrounding the cross shaft and arranged to be unwound as the speed of the governor shaft increases, means for limiting sidewise bending of the spring comprising a disk member secured to the cross shaft and having a surface adjacent the side of the spring facing away from the axis of rotation, which surface is tapered towards the spring axis, and means for transmitting movement of the ring into different angular positions with respect to the axis of rotation to an element to be controlled in response to speed changes.

2. A speed governor including a governor shaft, a cross shaft projecting through an opening in the governor shaft and being adjustably connected thereto, a ring having diametrically opposite portions rotatably supported on the ends of the cross shaft, means biasing the ring against the action of centrifugal force exerted on the ring during rotation of the governor shaft, a governor sleeve in alignment with the governor shaft and having an axial bore receiving an end portion of the governor shaft, means for transmitting angular motion of the ring to the sleeve comprising a link pivotally connected to the sleeve and to the ring, the pivotal connection between the ring and the link including a U-shaped lug integrally formed with the ring, an end portion of the link projecting between the legs of the U-shaped lug, a pivot connecting the legs to the end portion, and spring means surrounding the pin and disposed between the end portion of the link and adjacent surfaces of the legs, said spring means acting as a shock absorber to reduce shocks on the governor sleeve in the case of sudden speed changes and in the case of minor misalignment of the pilot valve and governor shaft.

DONALD F. WARNER.